April 2, 1963 G. J. NOVAK 3,083,843
MECHANISM FOR UNLOADING AND SEPARATING ARTICLES
Filed Feb. 26, 1960 7 Sheets-Sheet 3

FIG. A

INVENTOR
G. J. NOVAK
BY
ATTORNEY

April 2, 1963 G. J. NOVAK 3,083,843
MECHANISM FOR UNLOADING AND SEPARATING ARTICLES
Filed Feb. 26, 1960 7 Sheets-Sheet 4

INVENTOR
G. J. NOVAK
BY A.C. Schwarz, Jr.
ATTORNEY

April 2, 1963 G. J. NOVAK 3,083,843
MECHANISM FOR UNLOADING AND SEPARATING ARTICLES
Filed Feb. 26, 1960 7 Sheets-Sheet 6

INVENTOR
G. J. NOVAK
BY A.C. Schwarz, Jr.
ATTORNEY

United States Patent Office 3,083,843
Patented Apr. 2, 1963

3,083,843
MECHANISM FOR UNLOADING AND
SEPARATING ARTICLES
George J. Novak, Riverside, Ill., assignor to Western
Electric Company, Incorporated, New York, N.Y., a
corporation of New York
Filed Feb. 26, 1960, Ser. No. 11,199
6 Claims. (Cl. 214—8.5)

This invention relates to mechanism for unloading and separating articles, and more particularly to mechanism for unloading rows of parts from an apparatus and separating defective parts from the others.

An object of the invention is to provide an improved mechanism for unloading and separating articles.

Another object of the invention is to provide mechanism for unloading rows of parts from an apparatus and for separating defective parts from the others.

With these and other objects in mind, the invention as applied to a broaching machine includes a pair of holding members which are moved into engagement with opposite sides of a row of broached piece parts at a broaching station and then moved transversely of the row to carry the piece parts from the broaching station along a predetermined path through an ejecting station to an unloading station. As the row of parts are carried through the ejecting station a blast of compressed air is directed against one end of the row of parts to move it longitudinally relative to the holding members into engagement with adjustable stop means for positioning the defective piece part or parts laterally beyond the holding members. A stripper member is mounted at the ejecting station in the path of movement of the defective part or parts, which parts adhere to adjacent piece parts because of a film of lubricant on the surfaces thereof, and the stripper member serves to remove the defective piece part or parts from the others as they pass through the ejecting station.

Other objects and advantages of the invention will become apparent by reference to the following detailed description thereof and the accompanying drawings illustrating a preferred embodiment of the invention wherein.

Referring to the drawings, the present article unloading and separating mechanism is shown applied to a broaching apparatus designed to broach piece parts 15 of predetermined outline with notches 16 therein (FIG. 6) and to sever them from flat strips 17 of fibre which are arranged in stacks 18 of twenty-five or so strips (FIG. 5) and held together by any suitable means such as C-clamps 19 secured thereto in spaced relation to one end of the stack. Two stacks of strips 17 are moved through guideways 20 in a guide 21 on a frame member 23 of the apparatus and placed on horizontal seats 25 thereon in engagement with a stationary jaw 28 and are clamped thereagainst in predetermined positions in a broaching station of the apparatus by movable jaws 30. The movable jaws 30 are mounted for horizontal movement on the frame 23 and urged by springs 31 to normal open positions and are actuated into clamping positions by levers 35.

Each of the levers 35 is mounted for pivotal movement about a fixed pivot pin 36 and is actuated by a pair of power-operated actuating members 38 and 39 which are cylindrical in form and are slidably mounted in a bore 40 in the frame 23 on opposite sides of the lever 35 and have tapered end surfaces 42 engageable with the lever for imparting movement thereto. The actuating member 39 is formed on the end of a piston rod 44 of a piston 45 and the other actuating member 38 which is tubular and slidable on the piston rod 44 is fixedly secured to the cylinder 47 in which the piston 45 is mounted for reciprocatory movement. A plug 49 in the bore 40 serves as a stop for limiting the movement of the actuator 39 away from the lever 35, and a stop member 50 fixedly mounted on the frame 23 cooperates with a shoulder 51 on the actuating member 38 to limit its movement away from the lever 35.

Figure 1:
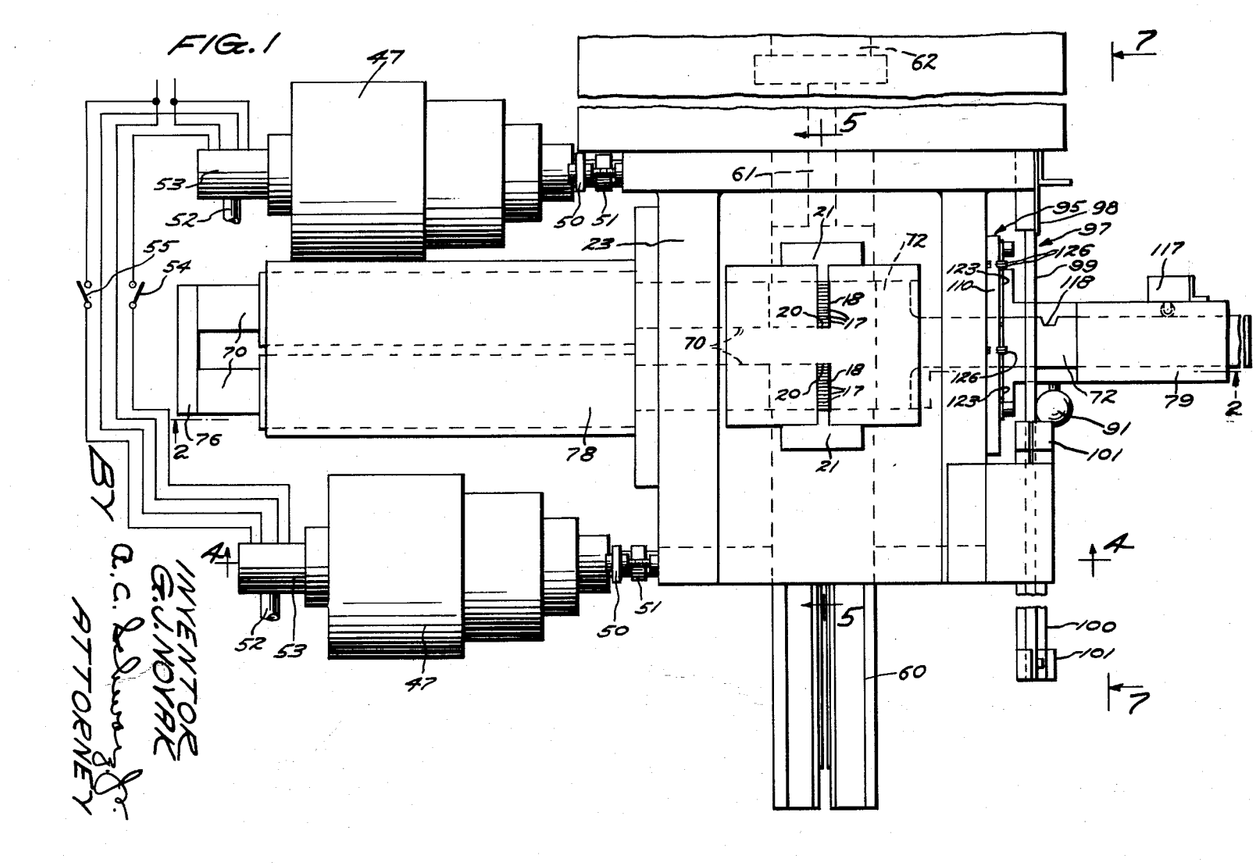
FIG. 1 is a fragmentary plan view of a broaching apparatus embodying the present invention.
Figure 4:
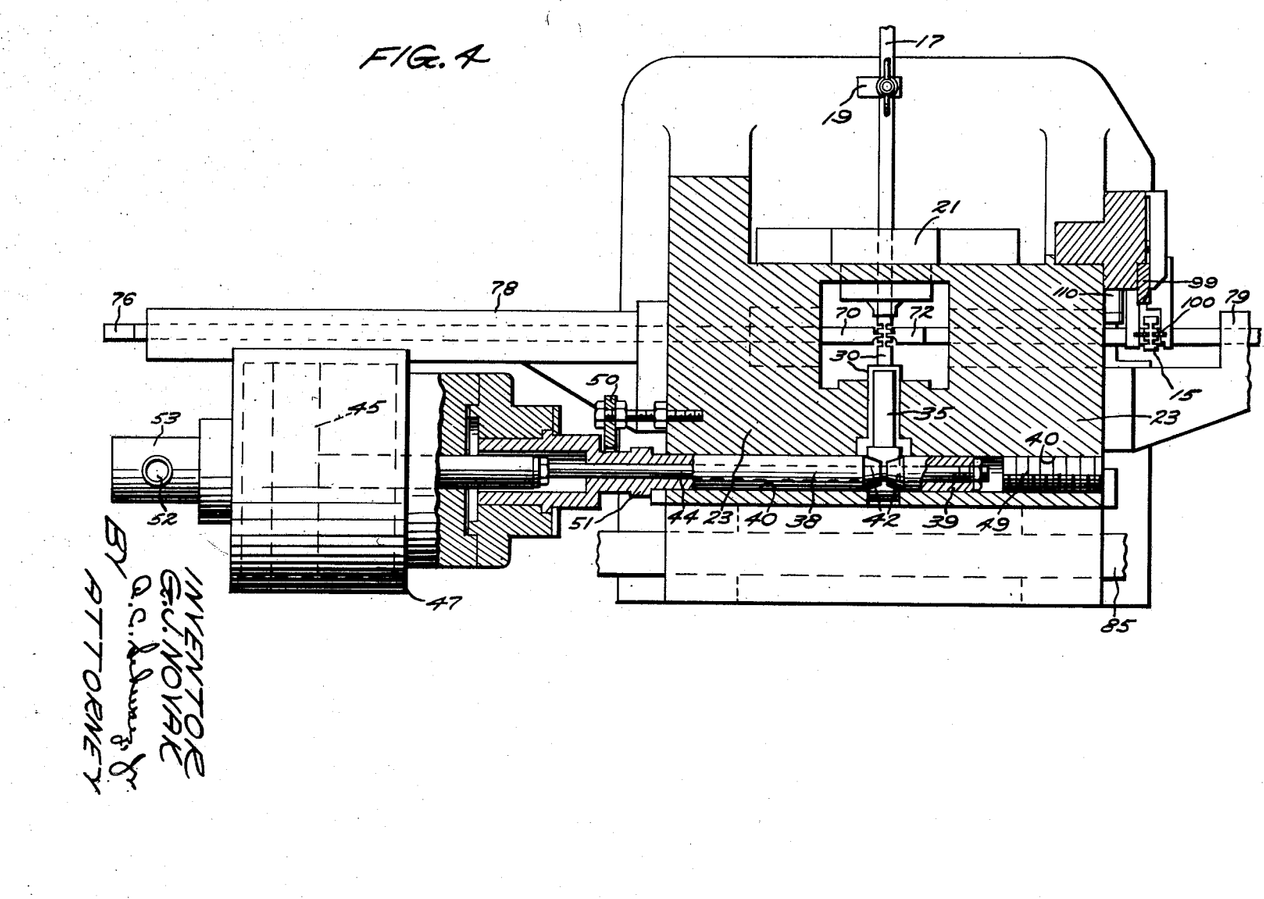
FIG. 4 is a vertical transverse sectional view through the broaching apparatus taken on the line 4—4 of FIG. 1.

It will thus be seen that the cylinder 47, the piston 45 and the actuating members 38, 39 associated therewith are mounted for floating movement on the frame 23 along the axis of the piston rod 44. Movement is imparted to the actuators 38 and 39 by the admission of compressed air from a supply line 52 (FIG. 1) to opposite ends of the cylinders under control of solenoid actuated valves 53 and switches 54 and 55 associated therewith (FIG. 1). Thus, after the stacks of strips 17 have been placed on the seats 25 of the broaching apparatus, the operator closes the switch 54 to effect the shifting of the valves 53 to one position and the flow of compressed air to the right-hand end of each of the cylinders 47 as viewed in FIG. 4. This causes the actuating members 38 and 39 to be moved toward each other into engagement with the levers 35 to impart movement thereto and to the movable jaws 30 to clamp the stacks of strips 17 against the fixed jaw 28. In response to closing of the switch 55, the valves 53 are shifted to a second position to effect the flow of compressed air to the opposite ends of the cylinders 47 and the movement of the actuating members 38 and 39 away from each other and from the levers 35 thus permitting the springs 31 to return the movable clamping jaws to their unclamped positions.

It will be understood that the stationary and movable jaws 28 and 30, respectively, for clamping the stacks 18 of strips 17 have cross-sectional shapes similar to the piece parts 15 to provide clearance for the cutting teeth of a broach 60 for broaching the piece parts 15. The broach 60 (FIG. 1) which is connected to plunger 61 of a hydraulic actuator 62 is advanced to its forward position prior to the loading and clamping of the stacks 18 of strips 17 in the apparatus, and after the stacks have been clamped in broaching position the broach is actuated to effect the broaching and severance of a row 63 of piece parts 15 from each of the stacks. Portions of the last piece part 15 of each row of piece parts are chipped during the broaching operation which renders the piece part defective and necessitates its separation from the remaining piece parts. As the broach becomes progressively dull it has been found that a second defective piece part and later a third defective piece part are formed at the end of the row and have to be separated from the remaining piece parts.

Figure 2:
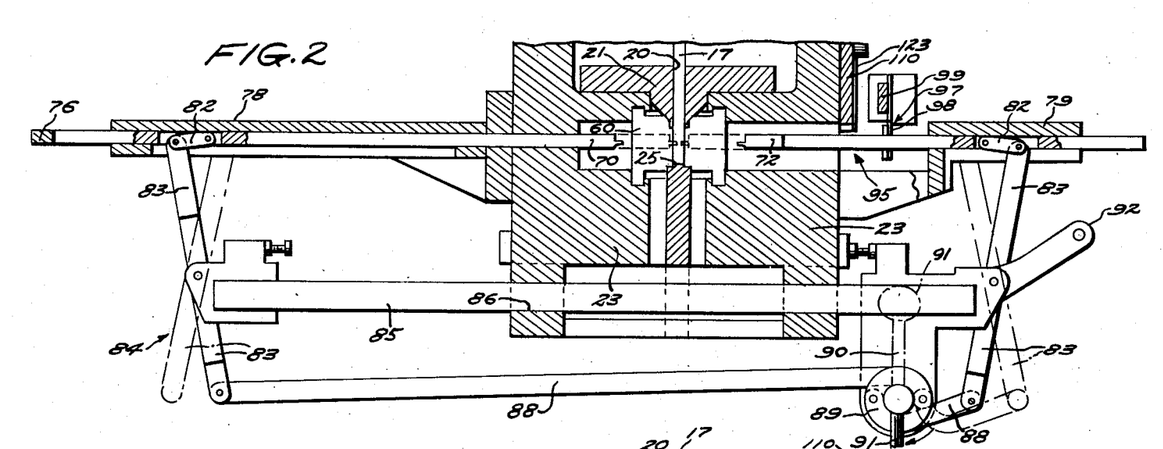
FIG. 2 is a vertical cross-sectional view through the broaching apparatus taken substantially along the line 2—2 of FIG. 1 and showing the holders for the broached piece parts in a normal inoperative position.
Figure 3:
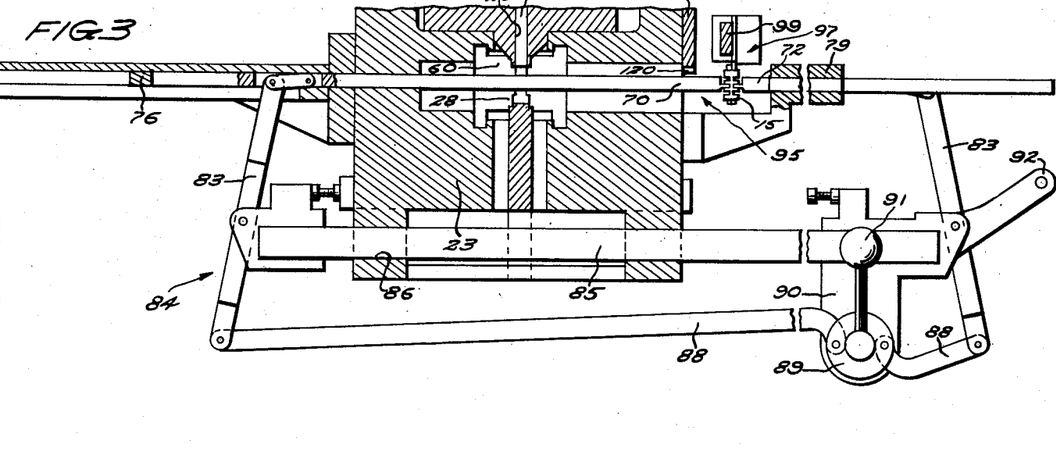
FIG. 3 is a cross-sectional view similar to FIG. 2 showing the apparatus after the piece parts have been broached and have been moved by the holders from the broaching station to the unloading station.
Figures 5, 6:
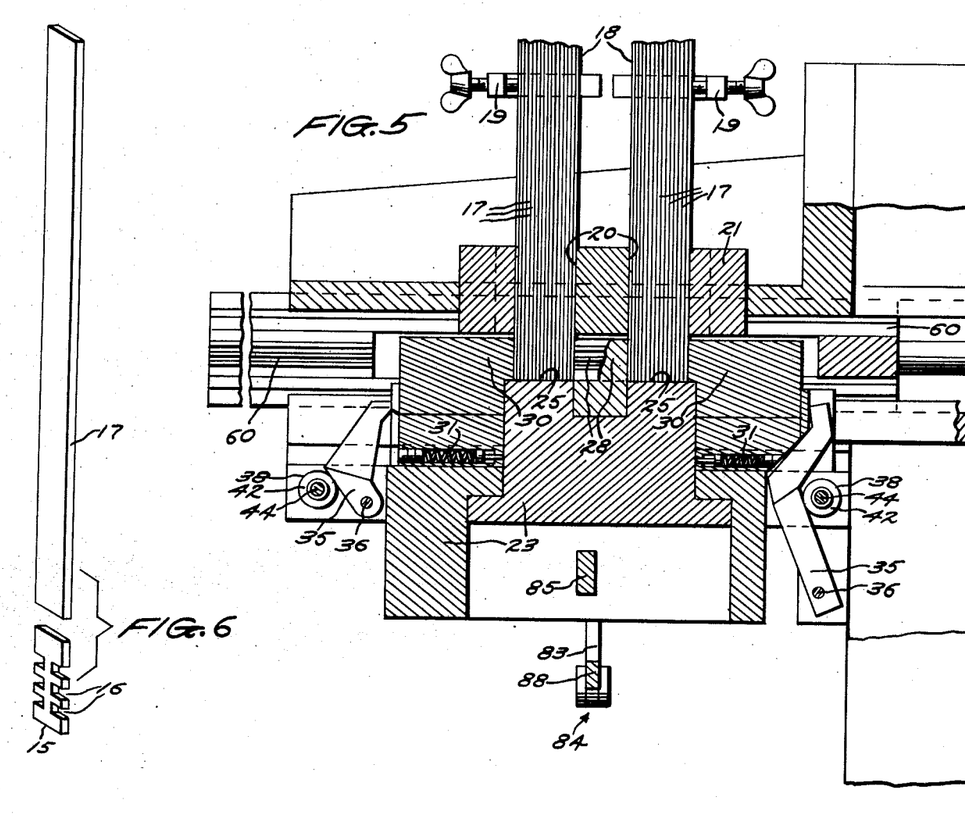
FIG. 5 is a fragmentary vertical longitudinal sectional view through the broaching apparatus taken along the line 5—5 of FIG. 1.
FIG. 6 is a perspective view of a strip and a piece part broached therefrom.
Figure 8:
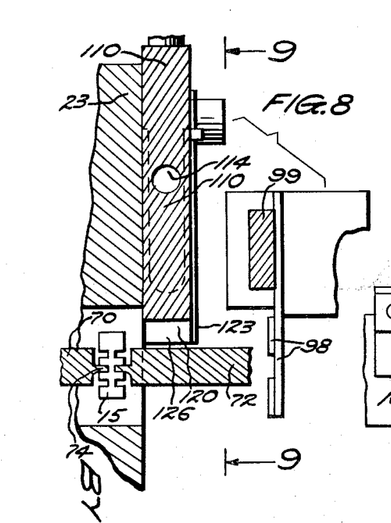
FIG. 8 is an enlarged fragmentary vertical cross-sectional view through the apparatus taken along line 8—8 of FIG. 7 and showing a row of piece parts about to enter an ejection station.
Figure 10:
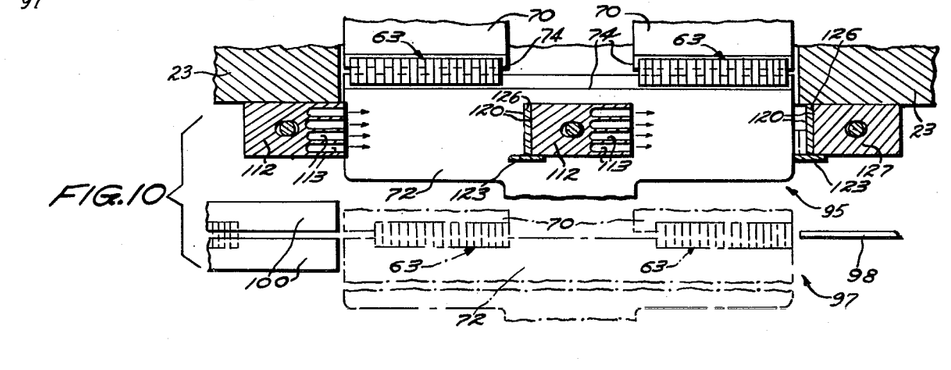
FIG. 10 if a fragmentary horizontal sectional view taken along the line 10—10 of FIG. 9 showing the rows of piece parts in full lines about to enter the ejection station and showing the row of parts in dotted lines in the unloading station after the two defective parts have been stripped therefrom.
Figure 11:
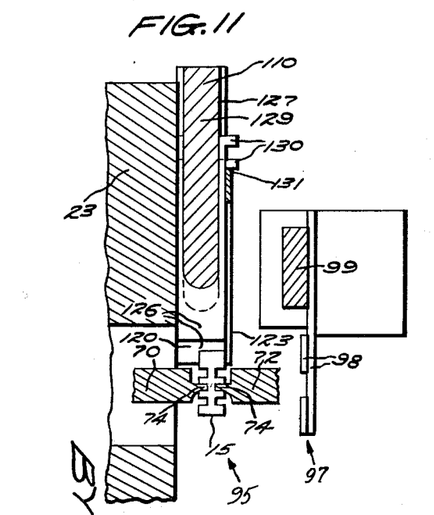
FIG. 11 is a fragmentary vertical cross-sectional view of the apparatus taken along the line 11—11 of FIG. 9 and showing the row of piece parts in the ejection station in alignment with the stripper member for stripping the defective parts therefrom.
Figure 12:
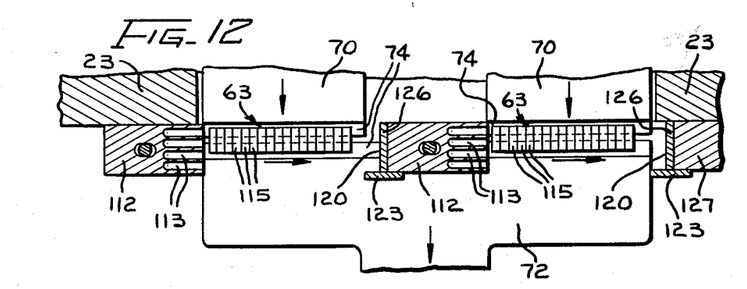
FIG. 12 is a fragmentary plan view similar to a portion of FIG. 10 showing the part supporting holders in the ejection station prior to the longitudinal movement of the parts on the holders.

The mechanism provided for unloading the two rows 63 of piece parts 15 after they have been broached and severed from the two stacks 18 of strips 17 is shown principally in FIGS. 2 and 3. This mechanism includes a pair of holding members 70 (FIGS. 1, 2, 10 and 11) in the form of elongated flat bars movable into engagement with one side of each row 63 of piece parts 15 and cooperable with a holding member 72 engageable with the opposite side of the two rows 63 of piece parts for supporting the piece parts after they have been released from the clamping jaws 30 and for moving them along a predetermined path transversely of the longitudinal axis of the rows 63 of piece parts and the movement of the broach 60. The holding members 70 and 72 are provided with narrow end flanges 74 (FIGS. 8, 10 and 11) engageable in the notches 16 of the piece parts 15 (FIG. 6).

The two holding members 70 which are connected together at one end by a member 76 (FIG. 1) and the holding member 72 which is T-shaped are slidably mounted in suitable slideways formed in guide members 78 and 79 secured to the frame 23 and are connected through links 82 (FIG. 2) to the upper end of a pair of levers 83 which are pivotally mounted on a carriage 84. This carriage has a bar 85 mounted in a slideway 86 in the frame 23 for slidably supporting the carriage 84 for horizontal movement between two predetermined positions. The lower ends of the lever 83 are connected by links 88 to a crank disc 89 which is oscillatory mounted on a bracket 90 on the bar 85 and is turned by means of a handle 91 to and from the positions shown in full and dotted lines in FIG. 2 to effect the movement of the holding members 70 and 72 into and out of engagement with the rows 63 of piece parts 15.

On completion of the cutting stroke of the broach 60 and the broaching of two rows of piece parts 15, the operator engages the handle 91 in its lower position and turns it 180° to effect the movement of the levers 83 from the full line positions to the dotted line positions in FIG. 2 and the movement of the holding members 70 and 72 into supporting engagement with the two rows 63 of piece parts 15 after which the unclamping switch 55 is manually actuated to effect the release of the clamping jaws 30 and the unclamping of the piece parts 15. The carriage 84 which is provided with a handle 92 is then moved manually to the right as viewed in FIG. 2 to carry the two rows 63 of parts supported on the holding members 70 and 72 horizontally into and past an ejecting station 95 to an unloading station 97 (FIGS. 2 and 3).

At the ejecting station 95 mechanism is provided for automatically removing the defective piece parts 15 from the others during the movement of the rows 63 of piece parts through the ejecting station 95. This mechanism includes a block 110 (FIGS. 1 and 7–11) secured to the side of the frame 23 and having a pair of nozzles 112 with laterally and downwardly directed orifices 113 (FIGS. 9 and 10) therein disposed at one side of the path of travel of each of the rows 63 of piece parts 15 and in close proximity to the upper portions of the end piece part 15 in each row as they are moved through the ejecting station 95. The orifices 113 in the nozzle 112 communicate with passageways 114 in the block 110 which are connected to a pipe line 115 for supplying compressed air thereto under control of a solenoid actuated valve 116 and a control switch 117 (FIG. 7) associated therewith.

The switch 117 is mounted on the guide member 79 (FIG. 1) and is actuated by a notch 118 in the shank of the holding member 72 to effect the issuance of blasts of air through the nozzles 112 against one end of the rows of piece parts 15 to move them bodily along and between the end flanges 74 of the holding members 70 and 72 and into contact with stop surfaces 120 which engage the upper portion of the endmost piece part 15 of each row. The stop surfaces 120 are disposed at the right-hand sides of the holding members 70 as viewed in FIGS. 9, 10, 12–14 to stop the rows of piece parts with the defective piece parts 15 located laterally beyond the holders 70 (FIG. 13) in which positions the defective piece parts are maintained by the adhesion of the piece parts to one another due to lubricant on the surfaces thereof. Stripper members 123 of spring steel are secured by screws 124 onto the side of the block 110 with a portion of the stripper members projecting downwardly and to the left of the stop surface 120 as viewed in FIGS. 9 and 10 and in the path of movement of the defective parts 15 for removing them from the other parts 15 as they pass through the ejecting station.

Figure 9:
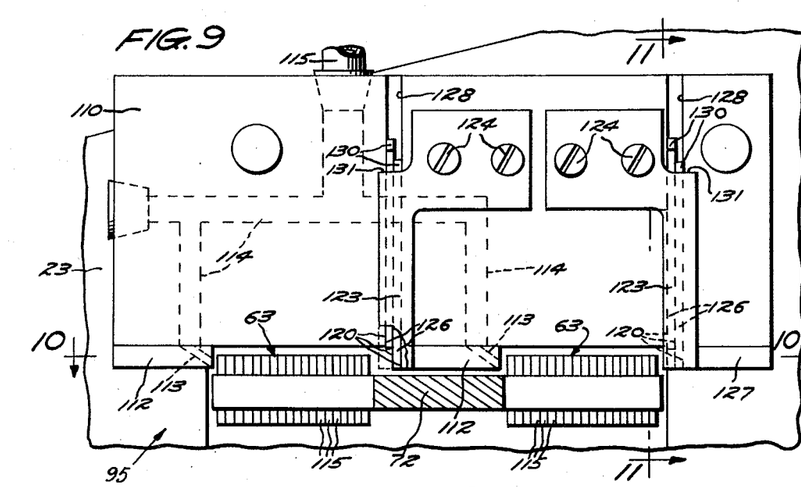
FIG. 9 is an enlarged fragmentary elevational sectional view of the apparatus taken on the line 9—9 of FIG. 8 and showing the stripping mechanism set up for removing two defective piece parts from a row thereof.

In order to selectively separate one, two or three of the defective parts 15 from the other parts in accordance with the number of defective parts in the row, two of the stop surfaces 120 for each row of piece parts are formed on a pair of flat bifurcated stop members 126 (FIGS. 8–11, 15 and 17) and a third stop surface 120 is formed on the end of a stationary block 127 and on the end of one of the nozzles 112. The bifurcated stop members 126 are slidably mounted on the block 110 in grooves 128 therein and are movable from lower operative positions, capable of engaging and stopping a row 63 of piece parts 15, to upper inoperative positions above the path of longitudinal movement of the row of piece parts as shown in FIG. 9. Laterally directed lugs 130 (FIGS. 9 and 11) on the upper portions of the stop members 126 cooperate with a shoulder 131 on the stripper member 125 to support the stop members in their lower positions, and frictional engagement between the spring legs of the stop members 126 and the block 110 serve to retain the stop members in their upper positions.

It will be understood that the switch 117 is actuated to effect the momentary blast of air from the nozzles 112 as the rows of piece parts move past the nozzles to effect the longitudinal movement of the rows of piece parts on the end flanges 74 of the holding members into engagement with the stop surfaces 120. When the broach 60 is relatively sharp and only one defective piece part appears in the row of parts, both of the stop members 126 are set in their lower positions (FIG. 15) to cause the first stop members 126 to engage the rows of piece parts and stop them with the single defective part 15 of each row located laterally beyond the holding member 70 for removal from the remaining parts by the stripper members 123.

Figure 16:
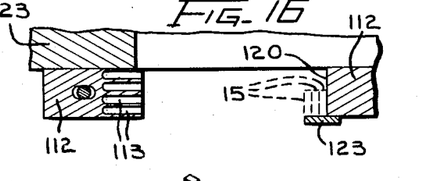
FIG. 16 is a view similar to FIG. 15 showing the stripping mechanism set up to remove three defective piece parts from the row of piece parts.
Figure 17:
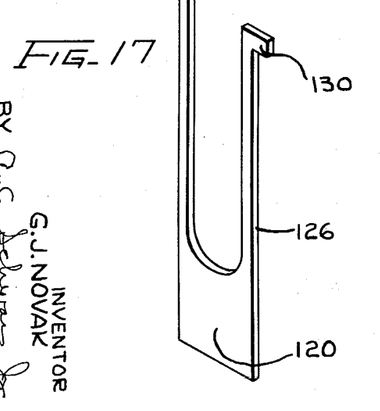
FIG. 17 is a perspective view of one of the stop members for the row of piece parts.

When two defective piece parts 15 are found in the row of parts the first stop member 126 is raised to its upper position so that the second stop member 126 (FIGS. 9 to 14) engages the end of the row of longitudinally moving piece parts and stops the row of piece parts with the two defective piece parts 15 projecting laterally beyond the holding member 70 (FIG. 13) in a position to be removed from the remaining parts by the stripper member 123 (FIG. 14) as the row of piece parts is moved by the holders 70 and 72 past the ejecting station 95. When three defective piece parts appear in the row of piece parts both stop members 126 are raised to upper position and the row of piece parts 15 is then stopped by the fixed stop surfaces 120 on the stationary block 112 or 127 (FIG. 16) with the three defective piece parts 15 located beyond the holding member 70 in position to be removed by the stripper member 123.

*Operation*

At intervals during the broaching of the piece parts 15, the operator ascertains the number of defective parts in each row thereof. With only one defective part in each row both of the stop members 126 of the stripping mechanism are disposed in their lower position (FIG. 15) to effect the stripping of a single defective piece part 15 from the row of piece parts as the row of piece parts is moved by the holders 70 and 72 past the ejecting station 95. When two defective parts appear in each row, the first stop member 126 of the stripping mechanism is raised to its upper position (FIGS. 9-14) to effect the stripping of the two defective parts from the row of parts as it is carried by the holders 70 and 72 past the ejecting station 95. When three defective parts appear in the row of parts, both stop members 126 of the stripping mechanism are disposed in their upper position (FIG. 16) to effect the stripping of the three defective parts 15 from the row of parts as it is carried by the holders past the ejecting station 95.

We shall assume that two defective piece parts appear at one end of each row of piece parts and that the stripping mechanism is set up as indicated in FIGS. 9-14 with the second stop member 126 in its lower position and the first stop member 126 in its raised position to effect the removal of their pair of defective parts 15 from the row of parts. With the holders 70 and 72 in their normal inoperative position as shown in FIG. 2, and with the broaching tool 60 in its forward position as shown in FIG. 5, two stacks of strips 17 are loaded into the broaching machine and clamped in operative position as shown in FIG. 5. Thereafter, the broach 60 is retracted to broach two rows 63 of piece parts 15 and sever them from the strips 17. The handle 91 is then engaged by the operator and turned from its lower position (FIG. 2) through 180° to its upper position, as shown in dotted lines in FIG. 2, to effect the movement of the holders 70 and 72 toward each other to a predetermined position with the flanges 74 of the holders 70 and 72 disposed in opposing recesses in the rows of the piece parts 15, as shown more clearly in FIGS. 8 and 11, to support the rows of piece parts for movement therewith from the broaching station past the ejecting station 95 to the unloading station 97 and to support the rows of piece parts for longitudinal movement along the flanges 74 of the holders.

Figure 13:
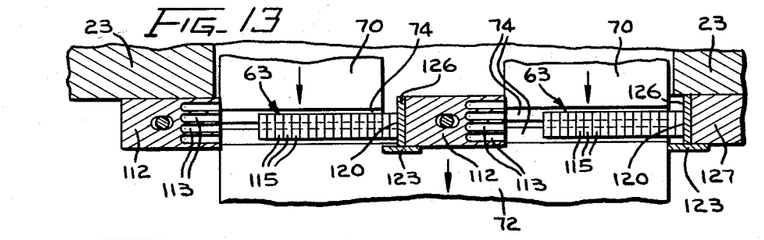
FIG. 13 is a view similar to FIG. 12 showing the part supporting holders in the ejection station and with the rows of piece parts shifted longitudinally on the holders into engagement with stops therefor and with a pair of defective piece parts displaced beyond and to the right of one of the supports therefor.
Figure 14:
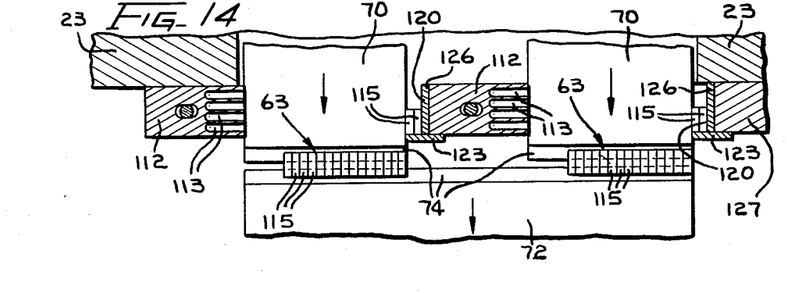
FIG. 14 is a view similar to FIG. 13 showing the rows of piece parts supported by the holders after the rows of piece parts have been moved through the ejection station and the two defective piece parts have been stripped therefrom.
Figure 15:
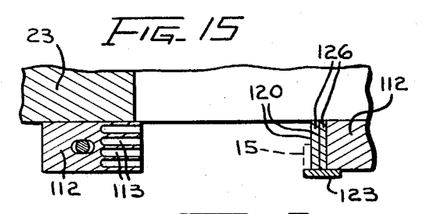
FIG. 15 is a plan view of a portion of the ejection station of the apparatus showing the stripping mechanism set up to remove a single defective piece part from a row of piece parts.

The jaws 30 are then released to release the rows of piece parts 15. Thereafter, the carriage 84 is moved to the right as viewed in FIG. 2, and as the rows of parts 15 are advanced by the holders 70 and 72 into close proximity to the ejecting station 95, the switch 117 is actuated to effect the issuance of jets of air from the nozzles 112. As the rows of parts 15 move into the ejecting station 95 and into the path of the air jets, the rows of parts 15 are shifted thereby longitudinally on the holders 70, 72 into engagement with the stop surface 120 of the second stop member 126 and with the two defective parts 15 disposed to the right of and beyond the right hand edges respectively of the holders 70 as shown in FIG. 13 and in alignment with the laterally projecting portions of the stripper members 123. As the rows 63 of piece parts are carried past the ejection station 95 by the holders 70 and 72, the pairs of defective parts 15 are moved into engagement with the stripper members 123 and are stripped thereby from the remainder of the parts 15 (FIG. 14) as the remainder of the parts are carried into the unloading station 97 as shown in dotted lines in FIG. 10.

Figure 7:
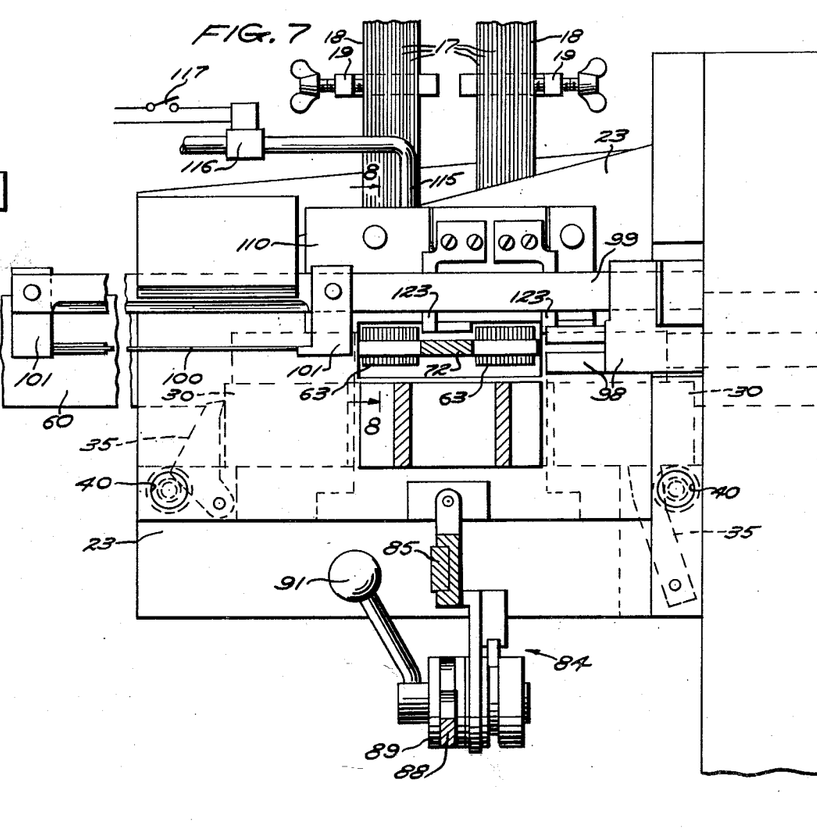
FIG. 7 is a fragmentary vertical cross-sectional view of the apparatus taken along the line 7—7 of FIG. 1.

In the unloading station 97, the rows 63 of piece parts 15 are aligned with a pusher 98 (FIGS. 1, 2, 7 and 10) which is slidably mounted on a bar 99 and is manually moved to the left as viewed in FIG. 7 for pushing the rows of piece parts 15 from the holding members 70 and 72 onto a rack 100. The rack 100 is in the form of a slotted bar removably supported on brackets 101 depending from the bar 99.

The defective piece parts 15 as they are separated from the other piece parts by the stripper members 123 at the ejecting station 95 drop into a receptacle (not shown) provided on the apparatus therefor. After the remaining piece parts 15 have been transferred from the holding members 70 and 72 onto the rack 100 at the unloading station 97, the carriage 84 is returned to its normal position (FIG. 2) and the handle 91 is turned 180° in the reverse direction to move the holding members 70 and 72 away from each other to their normal inoperative position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. Mechanism for unloading and separating articles comprising means including a holding member engageable with one side of a row of articles in abutting and adhering relation to one another for supporting the articles and moving them from a first station through an ejecting station in a first direction transversely of said row of articles, means at said ejecting station for blowing air against one end of said row of articles to move said articles relative to the holding member in a second direction longitudinally of said row, means at said ejecting station engageable with the other end of said row of articles for arresting the longitudinal movement thereof with a selected number of articles displaced laterally beyond said holding member, and means mounted at said ejecting station in the path of movement of said laterally displaced articles in said first direction for separating them from the other articles during movement of the row of articles through the ejecting station.

2. Mechanism for unloading and separating articles comprising means including a pair of holding members engageable with opposite sides of a row of articles in abutting and adhering relation to one another for supporting the articles and moving them along a predetermined path through an ejecting station in a first direction transversely of said row of articles, means at said ejecting station for directing a jet of compressed air against one end of said row of articles to move said row of articles relative to the holding members in a direction longitudinally of said row, adjustable means at said ejecting station disposed in the path of longitudinal movement of said row of articles to stop selectively the row of articles with one or more of the selected articles displaced laterally beyond said holding members, and a stripper member mounted in said ejecting station in the path of movement of the laterally displaced articles in said first direction for stripping them from the other articles as they are moved through the ejecting station.

3. Mechanism for unloading and separating articles comprising means including a holding member engageable with one side of a row of articles in abutting and adhering relation to one another for supporting the articles and moving them from a first station through an ejecting station in a first direction transversely of said row of articles, means at said ejecting station for issuing a stream of air against one end of said row of articles to move said row of articles relative to the holding member in a direction longitudinally of said row, a plurality of stop members, means for mounting said stop members at said ejecting station for movement to a first position in the path of movement of the row of articles and to a second position out of the path of longitudinal movement of the articles, means for moving said stop members from one position to the other to render them selectively operable to stop the row of articles with a selected number of articles displaced laterally beyond said holding member, and a stripper member mounted at said ejecting station in the path of movement of said displaced articles in said first direction for separating the selected articles from the others during the movement of the row of articles through the ejecting station.

4. Mechanism for unloading and separating articles comprising means including a pair of holding members engageable with opposite sides of a row of articles in abutting and adhering relation to one another for supporting the articles and moving them along a predetermined path through an ejecting station in a first direction transversely of said row of articles, a nozzle mounted at said ejecting station for directing a stream of air against one end of said row of articles, means operable in timed relation to the movement of said holding members for supplying compressed air to said nozzle to effect the movement of said row of articles relative to the holding members in a direction longitudinally of said row, a plurality of stop members, means for mounting said stop members on said frame at said ejecting station for movement to operative positions in the path of longitudinal movement of the row of articles and to inoperative positions out of the path of longitudinal movement of the articles, means for moving said stop members individually from one position to the other to render them selectively operable to stop the row of articles with a selected number of articles displaced laterally beyond one of said holding members, and a flat spring stripper member mounted on said frame at said ejecting station in the path of movement of said laterally displaced articles in said first direction for separating them from the other articles during the movement of the row of articles through the ejecting station.

5. Mechanism for unloading and separating articles comprising means including a holding member engageable with one side of a row of articles in abutting and adhering relation to one another for supporting the articles and moving them from a first station through an ejecting station in a first direction transversely of said row of articles, means at said ejecting station for effecting the engagement of one end of said row of articles and the movement of the articles relative to the holding member in a second direction longitudinally of said row, means at said ejecting station engageable with the other end of said row of articles for arresting the longitudinal movement thereof with a selected number of articles displaced laterally beyond said holding member, and a stripper member fixedly mounted in the path of movement of said laterally displaced articles in said first direction for separating said displaced articles from the other articles as the row of articles moves past the ejecting station.

6. Mechanism for unloading and separating articles comprising, means for holding a row of flat articles in abutting and adhering relation to one another and moving them in a first direction transversely of said row of articles from a first station along a predetermined path through an ejecting station, means at said ejecting station for effecting the movement of said row of articles relative to the holding means in a second direction longitudinally of said row of articles, adjustable means at said ejecting station disposed in the path of longitudinal movement of said row of articles to stop selectively the row of articles with one or more of the articles displaced laterally beyond said holding means, and means mounted at said ejecting station in the path of movement of the displaced articles in said first direction for separating the displaced articles from the other articles during the movement of the row of articles through said ejecting station.

References Cited in the file of this patent

UNITED STATES PATENTS

| 2,115,186 | Yager | Apr. 26, 1938 |
| 2,394,699 | Johnson | Feb. 12, 1946 |
| 2,585,786 | Kaplan et al. | Feb. 12, 1952 |
| 2,622,488 | Payne | Dec. 23, 1952 |
| 2,954,881 | Hopton et al. | Oct. 4, 1960 |